United States Patent
Karafillis et al.

(10) Patent No.: US 6,679,045 B2
(45) Date of Patent: Jan. 20, 2004

(54) FLEXIBLY COUPLED DUAL SHELL BEARING HOUSING

(75) Inventors: Apostolos Pavlos Karafillis, Arlington, MA (US); Peter Walter Mueller, Morrow, OH (US); John Robert Ramsey, Groveland, MA (US)

(73) Assignee: General Electric Company, Schenectady, NY (US)

(*) Notice: Subject to any disclaimer, the term of this patent is extended or adjusted under 35 U.S.C. 154(b) by 207 days.

(21) Appl. No.: 10/024,696

(22) Filed: Dec. 18, 2001

(65) Prior Publication Data

US 2003/0110778 A1 Jun. 19, 2003

(51) Int. Cl.[7] .................. F02G 3/00; F01D 25/16; F16C 19/50
(52) U.S. Cl. .............. 60/39.08; 60/799; 184/6.11; 384/476; 384/277; 415/111; 415/178
(58) Field of Search .................. 60/39.08, 39.83, 60/799; 415/111, 112, 176, 178; 184/6.11; 384/222, 313, 321, 467, 557, 476

(56) References Cited

U.S. PATENT DOCUMENTS 3,269,786 A  8/1966  Diver et al.
4,478,551 A  10/1984 Honeycutt et al.
4,979,872 A  12/1990 Myers et al.

OTHER PUBLICATIONS

GE Aircraft Engines, Excerpt Engine A, in use in this country for more than one year.

GE Aircraft Engines, Excerpt Engine B, in use in this country for more than one year.

GE Aircraft Engines, Excerpt Engine C, in use in this country for more than one year.

GE Aircraft Engines, Excerpt Engine D, in use in this country for more than one year.

*Primary Examiner*—Charles G. Freay
(74) *Attorney, Agent, or Firm*—Nathan D. Herkamp; Francis L. Conte

(57) ABSTRACT

A bearing housing includes inner and outer shells through which a rotor shaft may extend. A service tube is fixedly joined to the inner shell and extends through a service aperture in the outer shell. A flexible coupling sealingly joins the service tube to the outer shell at the service aperture for permitting differential thermal movement between the inner and outer shells at the service tube.

20 Claims, 3 Drawing Sheets

FLEXIBLY COUPLED DUAL SHELL BEARING HOUSING

BACKGROUND OF THE INVENTION

The present invention relates generally to gas turbine engines, and, more specifically, to rotor bearings therein.

In a gas turbine engine, air is pressurized in a compressor and mixed with fuel in a combustor for generating hot combustion gases. The hot gases flow downstream through turbine stages which extract energy therefrom. A high pressure turbine is joined to the compressor by a rotor shaft. Another rotor shaft joins a low pressure turbine to a fan disposed upstream from the compressor in an exemplary turbofan gas turbine aircraft engine application.

The two rotor shafts are mounted in suitable bearings supported in corresponding stator frames of the engine. Each bearing has a corresponding bearing housing through which lubricating oil is suitably channeled during operation.

One bearing supporting the high pressure turbine rotor shaft may be located in the center bore of the engine inside the surrounding annular combustor. The heat generated by the combustor during operation also heats the adjacent bearing housing and subjects the bearing housing to thermally induced stress during operation. Such thermal stresses increase as the differential temperature between hot and cooler housing components increase, especially where adjacent components restrain such thermal expansion therebetween.

The bearing housing may be protected in a conventional manner by using a surrounding thermal shield between it and the hot combustor, and by channeling bleed air from the compressor to provide a thermal air barrier between the combustor and the bearing housing. This increases the complexity of the bearing housing in this location, and in relatively small gas turbine engines, the ability to introduce such features in the bearing housing is limited by the small available space.

In one conventional configuration, the bearing housing includes an inner structural shell in which the bearing is mounted, with opposite axial ends of the inner shell being sealed to the rotor shaft. Various service tubes or lines carry lubricating oil to and from the inner shell, as well as providing air ventilation thereof.

The inner shell may be surrounded by an outer shell which is pressurized using air bled from the compressor for preventing leakage of the lubricating oil from the inner shell. And, the air inside the outer shell provides a thermal barrier for the inner shell.

The service lines must extend through the outer shell, and therefore require suitable seals therewith. In one conventional configuration, the service lines may be rigidly interconnected with the outer and inner shells to provide a suitable solid metal seal therebetween in the local vicinity of the corresponding service lines. However, the outer shell will operate at a greater temperature than the inner shell due to the hot combustion environment surrounding the outer shell. The inter-shell plenum is pressurized with cooler bleed air and operates at a correspondingly lower temperature. And, the oil within the inner shell is substantially cooler yet.

Accordingly, the outer shell will thermally expand both radially and axially relative to the inner shell with physical constraints therebetween created by the local rigid joints at the respective service lines. Those joints are therefore subject to thermal stresses during operation which may be substantial for certain engine configurations, and may lead to a shortened useful life of the bearing housing.

Accordingly, it is desired to provide an improved bearing housing subject to combustor heating having reduced thermal stress therein.

BRIEF SUMMARY OF THE INVENTION

A bearing housing includes inner and outer shells through which a rotor shaft may extend. A service tube is fixedly joined to the inner shell and extends through a service aperture in the outer shell. A flexible coupling sealingly joins the service tube to the outer shell at the service aperture for permitting differential thermal movement between the inner and outer shells at the service tube.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
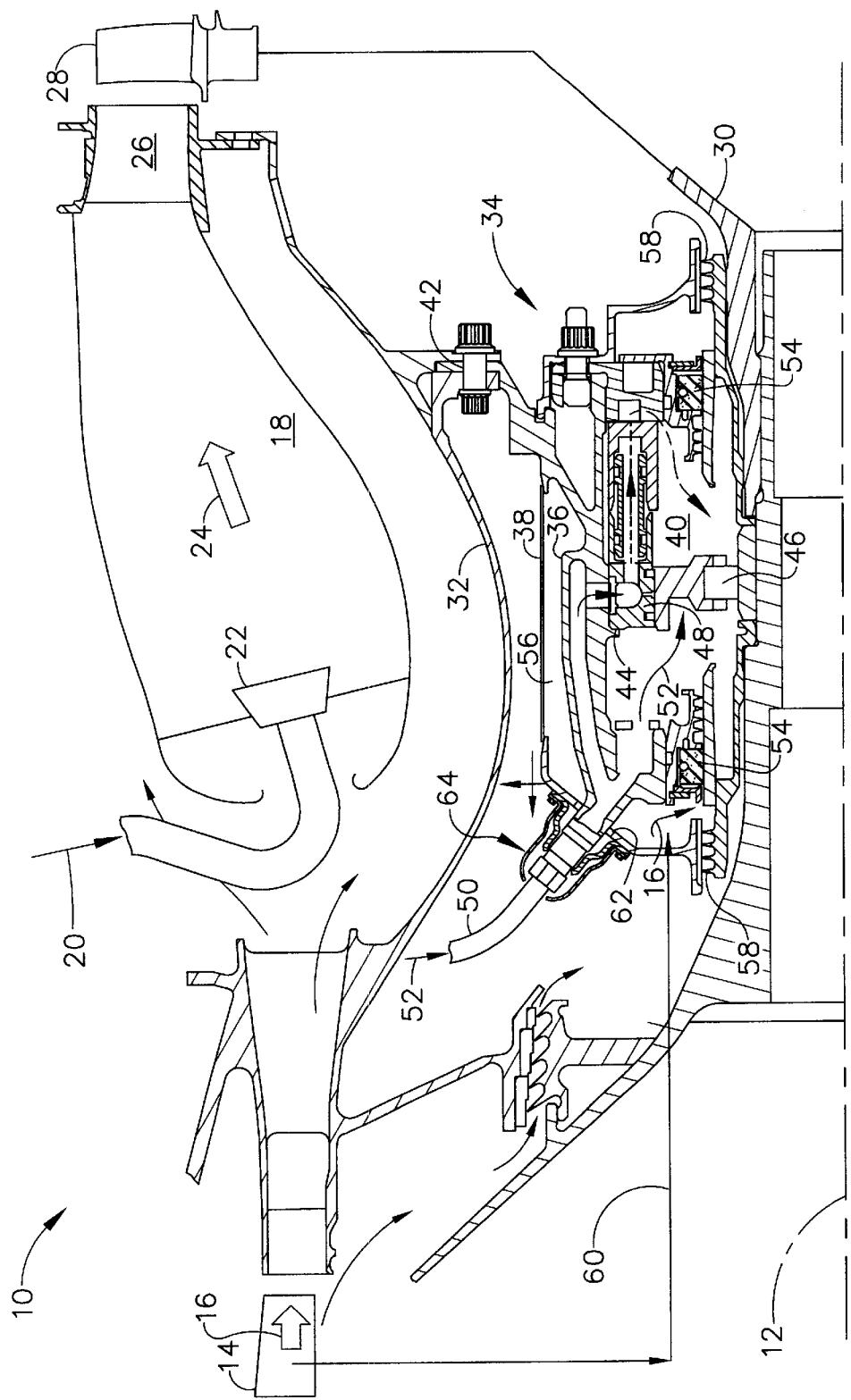
FIG. 1 is a schematic axial sectional view of a portion of an exemplary turbofan gas turbine engine including a bearing housing in accordance with an exemplary embodiment of the present invention.

Illustrated schematically in FIG. 1 is a portion of an exemplary turbofan gas turbine engine 10 which is axisymmetrical about a longitudinal or axial centerline axis 12. The engine includes a multistage axial compressor 14 configured for pressurizing air 16 which is discharged into an annular combustor 18. Fuel 20 is injected through the upstream or dome end of the combustor through corresponding fuel injectors 22 for mixing with the pressurized air, and is then ignited for generating hot combustion gases 24 which are discharged from the combustor through a high pressure turbine nozzle 26.

A high pressure turbine 28 is disposed downstream of the turbine nozzle 26 and includes a row of turbine rotor blades extending radially outwardly from a supporting rotor disk in a conventional configuration. The turbine rotor is joined to the rotor of the compressor by a corresponding rotor shaft 30.

A low pressure turbine (not shown) is disposed downstream from the high pressure turbine and is joined to a fan (not shown) disposed upstream of the compressor 14 by another shaft (not shown) mounted inside the bore of the high pressure turbine rotor shaft 30. This turbofan engine configuration is one example of the engine, which may have any other form as desired in which the high pressure turbine rotor shaft 30 extends through the central bore of the combustor for operatively joining together the compressor and high pressure turbine.

Disposed radially inwardly of the combustor 18 is an annular, combustor inner casing 32 from which is supported an annular bearing housing 34 in any suitable manner.

The bearing housing includes coaxial or concentric inner and outer shells 36, 38, with the inner shell having a center bore or plenum 40 which receives axially therethrough the rotor shaft 30. The inner shell is a structural, load bearing member, and also includes a radial mounting flange 42 which is suitably fixedly joined by conventional fasteners to a complementary radial flange of the inner casing 32 which supports the bearing housing.

The inner shell 36 is generally cylindrical and includes a conical aft outboard portion terminating in the mounting flange 42 for mounting the bearing housing to the inner support casing 32. The conical portion extends from the middle region of the inner shell in which is located an annular seat 44 which receives a bearing 46 which in turn supports the shaft 30 inside the shell.

The bearing 46 may have any conventional configuration, such as the roller bearing illustrated, and may be mounted in the bearing seat 44 in any conventional manner. In the exemplary embodiment illustrated in FIG. 1, the outer race of the bearing is mounted in a conventional cantilevered squirrel cage support which in turn is connected to an annular damper ring 48.

An oil service tube or line 50 is fixedly joined to the inner shell 36 in any conventional manner for channeling lubricating oil 52 to the bearing. For example, the inner shell may be formed with suitable channels therethrough for delivering some of the oil into the damper ring 48 for providing a squeeze film of oil between the inner perimeter of the damper ring and the outer perimeter of the bearing inner race. During operation, oil separates the damper ring from the bearing inner race and provides damping therebetween. The inner shell includes additional oil channels for distributing the lubricating oil to the rotor bearing itself from both its forward and aft sides in any conventional manner.

To contain the lubricating oil inside the inner shell, suitable means 54 are provided for sealing the inner shell at its opposite axial ends to the rotor shaft 30 which rotates therein during operation. The sealing means 54 may have any conventional configuration, such as carbon seals and associated labyrinth seals, which permit rotation of the rotor shaft inside the stationary inner shell while providing an effective seal at the rotary interface therebetween. In this way, the center bore or plenum 40 of the inner shell is fully enclosed by the inner shell surrounding the rotor shaft for maintaining a closed environment therein in which the lubricating oil may be circulated.

Since the bearing housing 34 illustrated in FIG. 1 is located directly under the surrounding combustor 18, it is subject to heating by the hot combustion gases 24 generated during operation. The lubricating oil 52 provided to the bearing 46 is at a substantially reduced temperature, which must be limited to ensure the efficacy of the lubricating oil for promoting bearing life during operation.

The outer shell 38 surrounds the inner shell for further sealing the shaft and inner shell and providing a thermally insulting barrier around the inner shell. The outer shell 38 may have any suitable configuration and is generally cylindrical and concentrically surrounds the forward portion of the inner shell with a radial spacing therebetween defining an annular plenum 56.

The outer shell includes a forward section having an aft end fixedly joined, by welding or brazing for example, to the inner casing along the conical portion of the mounting flange 42 for suspending the forward portion of the outer shell around a respective portion of the rotor shaft. The outer shell preferably also includes an aft portion fixedly joined to the aft end of the inner shell, by suitable fasteners for example, and provides a barrier from the conical flange support suspended over another portion of the rotor shaft aft of the inner shell. In this way, the outer shell 38 is suitably configured for fully enclosing the inner shell between opposite axial ends thereof surrounding the rotor shaft extending therethrough.

Means 58 are provided at the opposite axial ends of the outer shell for sealing the outer shell to the rotor shaft 30. The sealing means 58 may have any conventional configuration, such as labyrinth seals with rotor teeth extending from the rotor shaft 30 and cooperating stator lands formed at the opposite ends of the outer shell. The teeth define small gaps with the cooperating lands and provide an effective rotary seal with the stationary outer shell.

Additional means 60 are provided for pressurizing the outer shell 38 with the air 16 for further sealing the oil inside the inner shell. The pressurizing means may have any conventional configuration, and preferably includes the compressor 14 itself from which a portion of the air 16 is bled from a suitable stage thereof and channeled through a bleed line or tube 60 suitably joined to the outer shell 38 with a conventional flow fitting therewith.

The compressor 14 illustrated in FIG. 1 is disposed upstream from the combustor 18, with the combustor surrounding the inner support casing 32 in which is located the bearing housing 34. Full pressure compressor discharge air is channeled to the combustor outside the inner casing 32 for undergoing combustion inside the combustor. The plenum defined inside the inner casing 32 is at a lower pressure during operation substantially less than the compressor discharge pressure due to conventional labyrinth seals between the inner casing and the rotor shaft.

Accordingly, the inter-stage bleed air channeled through the bleed line 60 is effective for pressurizing the inter-shell plenum 56 inside the outer shell 38 to a greater pressure than that experienced outside the outer shell. In this way, the shaft seals 54 are pressurized from outside for improving their sealing performance for containing the lubricating oil inside the inner shell. And, the bleed air 16 channeled inside the outer shell has a temperature substantially lower than that of the combustion gas temperature and provides a thermally insulating barrier between the combustor and the inner shell 36.

A considerable temperature gradient is therefore generated from the combustor 18 radially inwardly through the inner casing 32, outer shell 38, and inner shell 36 to the center bore 40 of the inner shell in which the bearing 46 is mounted. Accordingly, the inner and outer shells 36, 38 will expand radially outwardly from the engine centerline 12, and axially forward from the mounting flange 42 at different rates. The oil service tube 50 is fixedly joined to the forward end of the inner shell 36 in this exemplary embodiment, and is therefore subject to substantial differential thermal movement between the inner and outer shells.

In order to accommodate the differential thermal movement between the dual shells of the bearing housing, the outer shell includes a service aperture 62 through which the service tube 50 extends with a suitable amount of surrounding radial clearance therebetween. Since the inter-shell plenum 56 is pressurized with air during operation, a flexible coupling 64 in accordance with the present invention sealingly joins the service tube 50 to the outer shell at the service aperture to maintain the pressure of the pressurized air inside the outer shell.

The coupling 64 must be flexible for accommodating the differential thermal movement between the inner and outer shells at the junction with the service tube 50, while also permitting pressurization of the outer shell. By preventing the two shells from restraining thermal movement of each other at the service tube, thermally induced stress due to such restraint is eliminated. The service tube junction with both shells therefore experiences relatively low stress during operation for ensuring a correspondingly long useful life of the bearing housing.

Figure 2:
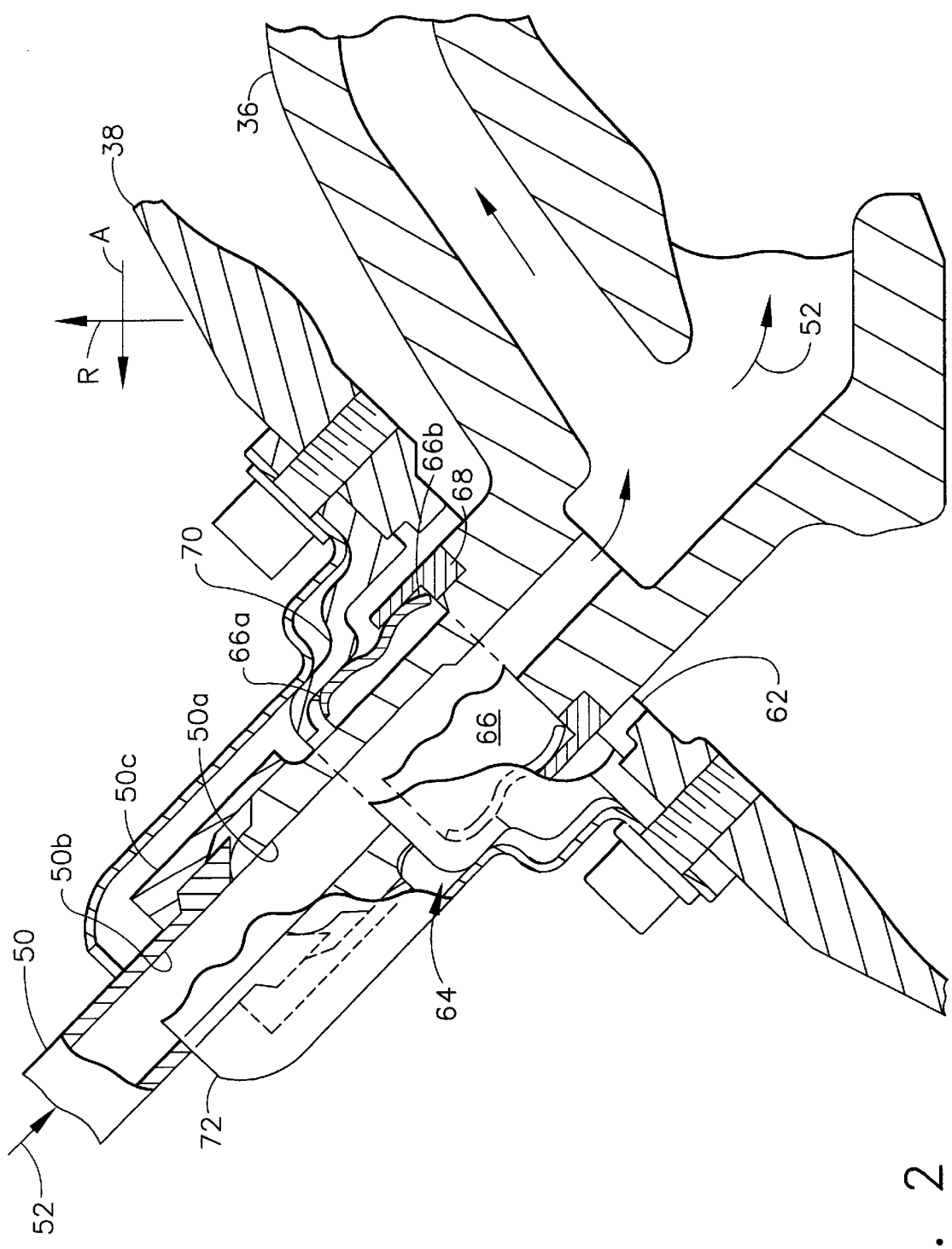
FIG. 2 is an enlarged axial sectional view through a portion of the bearing housing illustrated in FIG. 1 including a service tube extending therethrough with a flexible coupling in accordance with an exemplary embodiment of the present invention.

An exemplary embodiment of the flexible coupling 64 is illustrated in more detail in FIG. 2. The coupling includes a tubular bushing or sleeve 66 surrounding the service tube 50 at the service aperture 62. The service tube 50 may have any conventional form and typically includes a stem or nipple 50a integrally formed with the inner shell 36 in a common casting therewith. The nipple may have a distal end welded to the inner shell which engages an opposite mating seat 50b in the tube, which nipple and seat are locked together by a conventional ball nut 50c.

The coupling sleeve 66 may be configured for cooperating with the nipple end of the service tube for providing a flexible coupling between the service tube and the outer shell. As shown in FIG. 2, the sleeve 66 includes a proximal end 66a sealingly joined to the outer shell, and an opposite distal end 66b sealingly joined to the service tube at its junction with the inner shell 36.

The coupling 64 preferably also includes an inner seat 68 in the form of a retaining ring fixedly joined to the service tube by brazing or welding for example. The inner seat is spaced radially outwardly in part from the service tube for axially receiving the sleeve distal end 66b in a sliding contact fit therewith. The inner seat surrounds the service tube and receives the sleeve distal end in sealing abutment therewith in a telescoping manner under differential movement.

Correspondingly, an outer seat 70 in the exemplary form of a tubular cap is fixedly joined to the outer shell 38, by suitable threaded fasteners for example, around the service aperture. The proximal end of the outer seat 70 is suitably sealed to the outer shell in a contact fit therewith for example, and the distal end of the outer seat is suspended outwardly above the service aperture 62 around the service tube 50. The distal end of the outer seat is also spaced radially outwardly from the perimeter of the service tube for axially receiving the sleeve proximal end 66a in a sliding fit therewith.

Accordingly, the outer seat 70 surrounds both the service aperture 62 and the service tube extending therethrough for receiving in sealing abutment the sleeve proximal end 66a. Differential thermal movement between the dual shells at the service tube 50 is accommodated by axial translation of the sleeve 66 inside the opposite inner and outer seats 68, 70, as well as by tilting of the sleeve therein.

Since the outer shell 38 illustrated in FIG. 2 will operate at a greater temperature than that of the protected inner shell 36, the outer shell will expand axially in the axial direction A more than the axial expansion of the inner shell. And, the outer shell 38 will expand radially in the radial direction R greater than the radial expansion of the protected inner shell 36.

The service line 50 illustrated in FIG. 2 extends at an inclination angle of about 50 degrees through the outer shell in the forward direction from which the service tube 50 is routed. The engine-relative axial and radial differential thermal movement between the two shells is transposed to corresponding local axial and radial differential movement relative to the longitudinal axis of the inclined service tube 50 where it joins the inner shell 36.

Accordingly, as the service tube moves during operation inside the service aperture 62, the sleeve 66 maintains a sealing contact with the cooperating inner and outer seats as it slides axially therein and as it tilts as required for accommodating differential movement. In this way, an effective seal is provided by the flexible coupling 64 for maintaining pressurization of the air inside the outer shell, while accommodating differential thermal movement between the two shells at the junction with the service tube. Thermally induced stress in the service tube junction with the inner and outer shells is therefore minimized for increasing the useful life of the bearing housing.

The tubular sleeve 66 illustrated in FIG. 2 is preferably relatively thin sheet metal, which is substantially straight between its opposite ends. The opposite ends of the sleeve are preferably slightly bulbous or generally spherical having a convex outer surface both axially and radially. In this way, the opposite ends of the sleeve provide annular lines of sealing contact with the corresponding seats and permit differential axial movement and radial movement between the two seats as accommodated by sliding and tilting of the sleeve.

In the preferred embodiment illustrated in FIG. 2, the flexible coupling 64 preferably also includes a tubular heat shield 72 spaced slightly from and surrounding the tubular coupling, with the heat shield being fixedly joined at its proximal end to the outer shell 38 around the service aperture 62. The same fasteners mounting the outer seat 70 to the outer shell may also be used for mounting the heat shield atop the outer seat on the outer shell. In this way, the flexible coupling is protected from the surrounding hot environment by the heat shield, and the heat shield improves the durability of the flexible coupling.

Figure 3:
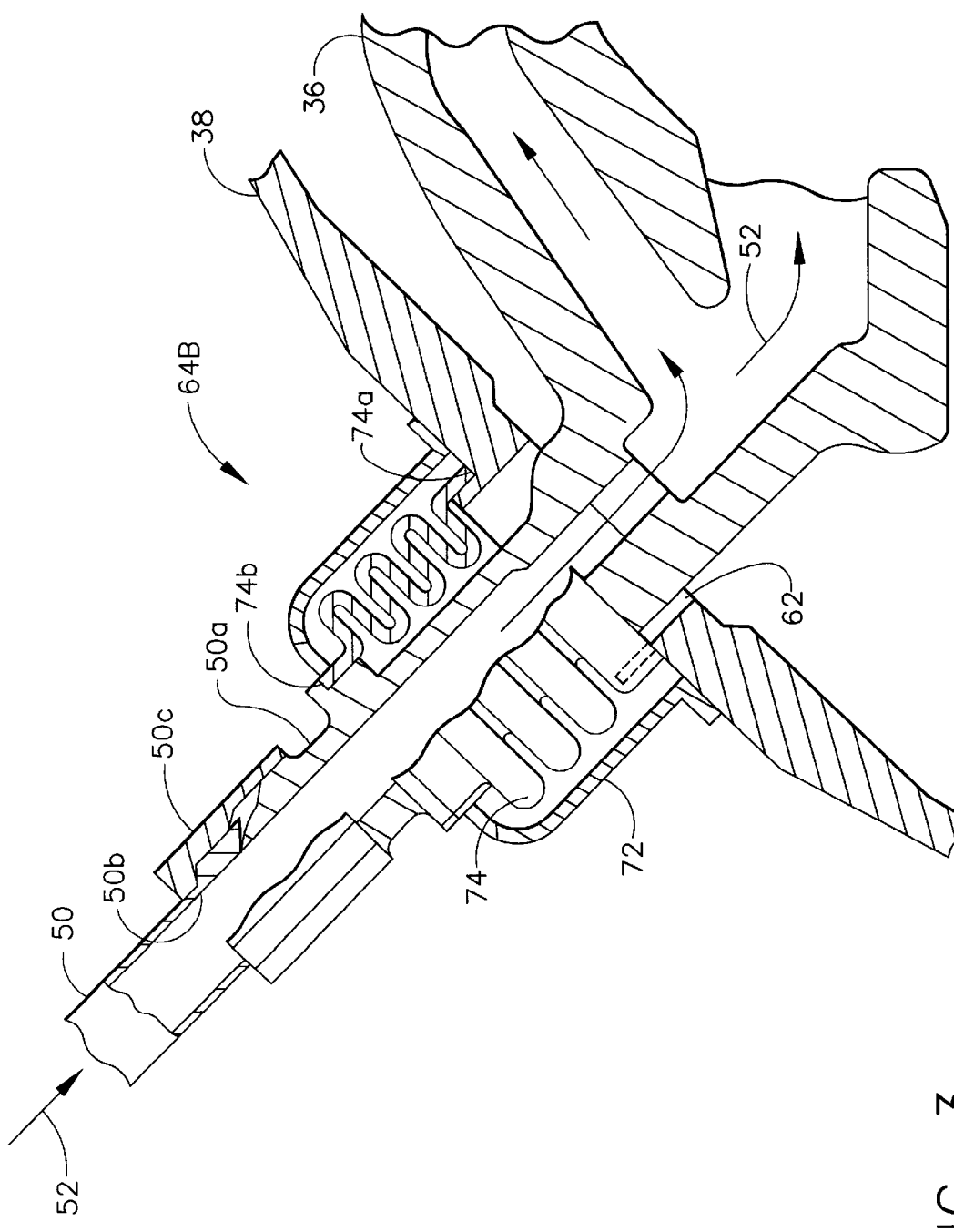
FIG. 3 is an enlarged axial sectional view, like FIG. 2, of the service tube extending through the bearing housing with a flexible coupling in accordance with another embodiment of the present invention.

FIG. 3 illustrates an alternate embodiment of the flexible coupling 64B in which the sleeve 74 is corrugated and defines a flexible tubular bellows surrounding the service tube 50 at the service aperture 62. The bellows is preferably two-ply sheet metal for redundancy and self-damping, and includes opposite proximal and distal ends 74a,b.

The bellows proximal end 74a is preferably fixedly joined to the outer shell 38 around the service aperture 62 by being either brazed or welded thereto. And, the bellows distal end 74b is preferably fixedly joined to the nipple end of the service tube 50 at a corresponding annular flange by either being brazed or welded thereto.

Accordingly, the bellows 74 provides a seal between the service tube 50 and the outer shell 38 for maintaining pressurization inside the outer shell, with the bellows corrugations permitting substantially unrestrained differential thermal movement between the inner and outer shells at the service tube. The two shells are therefore not restrained by each other at the service tube junction for maintaining relatively low thermal stress during operation for extended service life of the bearing housing.

Like the embodiment illustrated in FIG. 2, the embodiment illustrated in FIG. 3 preferably also includes a tubular heat shield 72 surrounding the bellows coupling, with the heat shield being suitably fixedly joined to the outer shell around the service aperture.

Another substantial advantage attributable to structurally uncoupling the two shells 36, 38 at the service line 50 is the elimination of circumferential distortion of the inner shell at the bearing seat 44. Analysis indicates that structural coupling of the two shells at the service line would cause local distortion of the inner shell at the bearing seat 44. That circumferential distortion would be reflected in the damping interface between the damper ring 44 and the inner race of the bearing having undesirable variation in the radial gap therebetween.

The flexible coupling 64 disclosed above structurally uncouples the two shells from each other for maximizing the concentricity of the bearing seat 44, damper ring 48, and bearing 46 for ensuring a more uniform radial gap between the bearing inner race and the damper ring for improved damping performance during operation.

The bearing housing disclosed above typically requires several service lines for oil and ventilating air spaced circumferentially around the perimeter thereof. And, those service lines which extend through the outer shell to terminate in the inner shell would preferably all use the flexible coupling described above for reducing thermally induced stress in the housing during engine operation.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured Letters Patent of the United States is the invention as defined and differentiated in the following claims in which we claim:

1. A bearing housing comprising:
   an inner shell having a center bore for receiving a rotor shaft therethrough, a radial mounting flange for mounting said inner shell to a support casing, a seat for receiving a bearing for supporting said shaft inside said inner shell, and a service tube fixedly joined to said inner shell for channeling a fluid;
   an outer shell surrounding said inner shell and fixedly joined thereto, and including a service aperture receiving said service tube therethrough; and
   a flexible coupling sealingly joining said service tube to said outer shell at said service aperture for permitting pressurization of said outer shell and differential thermal movement between said inner and outer shells at said service tube.

2. A housing according to claim 1 wherein said flexible coupling comprises a tubular sleeve surrounding said service tube at said service aperture, with a proximal end of said sleeve being sealingly joined to said outer shell, and an opposite distal end of said sleeve being sealingly joined to said service tube.

3. A housing according to claim 2 wherein said coupling further comprises an inner seat surrounding said service tube for receiving in sealing abutment said sleeve distal end, and an outer seat surrounding said service aperture for receiving in sealing abutment said sleeve proximal end.

4. A housing according to claim 3 wherein said sleeve is substantially straight, and said proximal and distal ends thereof are bulbous, and said inner and outer seats are cylindrical for permitting axial and pivotal movement therebetween.

5. A housing according to claim 4 wherein:
   said inner seat comprises a retaining ring fixedly joined to said service tube, and being spaced radially outwardly therefrom in part for axially receiving said sleeve distal end in a sliding fit therewith; and
   said outer seat comprises a tubular cap fixedly joined to said outer shell around said service aperture and said service tube, and being spaced radially outwardly from said service tube for axially receiving said sleeve proximal end in a sliding fit therewith.

6. A housing according to claim 5 further comprising a tubular heat shield surrounding said tubular coupling, and fixedly joined to said outer shell around said service aperture.

7. A housing according to claim 2 wherein said sleeve is corrugated and defines a flexible bellows.

8. A housing according to claim 7 wherein said sleeve proximal end is fixedly joined to said outer shell around said service aperture, and said sleeve distal end is fixedly joined to said service tube.

9. A housing according to claim 8 further comprising a tubular heat shield surrounding said tubular coupling, and fixedly joined to said outer shell around said service aperture.

10. A housing according to claim 2 further comprising:
    means for sealing said inner shell to said shaft;
    means for sealing said outer shell to said shaft; and
    means for pressurizing said outer shell to seal oil inside said inner shell.

11. A housing according to claim 10 further comprising:
    said support casing surrounding said outer shell, and fixedly joined to said inner shell at said mounting flange thereof; and
    said pressurizing means comprise a compressor for pressurizing air, and a bleed line for channeling pressurized air inside said outer shell; and
    said compressor is disposed upstream from a combustor surrounding said support casing, and is effective for channeling compressed air to said combustor for mixing with fuel therein and generating hot combustion gases which heat said bearing housing during operation.

12. A bearing housing comprising:
    concentric inner and outer shells;
    a service tube fixedly joined to said inner shell and extending through a service aperture in said outer shell; and
    a flexible coupling sealingly joining said service tube to said outer shell at said service aperture for permitting differential movement between said inner and outer shells at said service tube.

13. A housing according to claim 12 wherein said flexible coupling comprises:
    a tubular sleeve surrounding said service tube at said service aperture;
    an inner seat surrounding said service tube for receiving in sealing abutment one end of said sleeve; and
    an outer seat surrounding said service aperture for receiving in sealing abutment an opposite end of said sleeve.

14. A housing according to claim 13 wherein:
    said sleeve is substantially straight between said opposite ends thereof;
    said inner seat comprises a retaining ring fixedly joined to said service tube; and
    said outer seat comprises a tubular cap fixedly joined to said outer shell around said service aperture.

15. A housing according to claim 14 further comprising a tubular heat shield surrounding said tubular coupling, and fixedly joined to said outer shell around said service aperture.

16. A housing according to claim 12 wherein said flexible coupling comprises a tubular bellows surrounding said service tube at said service aperture, and having opposite ends fixedly joined to said service tube and said outer shell around said service aperture.

17. A housing according to claim 16 further comprising a tubular heat shield surrounding said tubular coupling, and fixedly joined to said outer shell around said service aperture.

18. A bearing housing comprising:

coaxial inner and outer shells;

said inner shell including a bearing for supporting a rotor shaft extending therethrough;

means for sealing said inner shell to said rotor shaft;

means for sealing said outer shell to said rotor shaft;

a service tube fixedly joined to said inner shell and extending through a service aperture in said outer shell for channeling oil to said bearing;

means for pressurizing said outer shell with air to seal said oil inside said inner shell; and a flexible coupling sealingly joining said service tube to said outer shell at said service aperture for permitting differential thermal movement between said inner and outer shells at said service tube.

19. A housing according to claim 18 further comprising:

a combustor inner casing surrounding said outer shell, and fixedly joined to said inner shell for support thereof; and said pressurizing means comprise a compressor and a bleed line for channeling pressurized air therefrom to said outer shell.

20. A housing according to claim 19 wherein said flexible coupling comprises a tubular sleeve surrounding said service tube at said service aperture, with a proximal end of said sleeve being sealingly joined to said outer shell, and an opposite distal end of said sleeve being sealingly joined to said service tube.

* * * * *

UNITED STATES PATENT AND TRADEMARK OFFICE
CERTIFICATE OF CORRECTION

PATENT NO. : 6,679,045 B2
DATED : January 20, 2004
INVENTOR(S) : A.P. Karafillis et al.

It is certified that error appears in the above-identified patent and that said Letters Patent is hereby corrected as shown below:

<u>Column 3,</u>
Lines 29 and 31, delete "inner" and substitute -- outer --; and <u>Column 7,</u>
Lines 4 and 11, delete "inner" and substitute -- outer --.

Signed and Sealed this

Fifteenth Day of June, 2004

JON W. DUDAS
*Acting Director of the United States Patent and Trademark Office*